(12) United States Patent
Toeppen

(10) Patent No.: US 7,150,531 B2
(45) Date of Patent: Dec. 19, 2006

(54) AUTOSTEREOSCOPIC PROJECTION VIEWER

(75) Inventor: John S. Toeppen, Livermore, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 10/649,314

(22) Filed: Aug. 26, 2003

(65) Prior Publication Data
US 2005/0046795 A1    Mar. 3, 2005

(51) Int. Cl.
| | |
|---|---|
| *G03B 21/00* | (2006.01) |
| *G03B 35/00* | (2006.01) |
| *G02B 27/00* | (2006.01) |
| *G02B 21/60* | (2006.01) |
| *H04N 13/04* | (2006.01) |

(52) U.S. Cl. .................. 353/7; 353/6; 359/464; 359/15; 359/23; 359/475; 359/478; 359/458; 348/51; 348/40; 352/57

(58) Field of Classification Search ............. 353/6–7; 359/464, 15, 23, 457, 462, 466, 475, 478, 359/458; 348/51, 42, 40; 351/240; 352/57
See application file for complete search history.

(56) References Cited

U.S. PATENT DOCUMENTS

| | | | | |
|---|---|---|---|---|
| 3,447,854 | A | | 6/1969 | Minter ............... 359/464 |
| 3,959,580 | A | | 5/1976 | Chocol ............... 348/42 |
| 4,621,897 | A | * | 11/1986 | Bonnet ............... 359/462 |
| 4,674,853 | A | | 6/1987 | Street ............... 396/330 |
| 4,874,214 | A | * | 10/1989 | Cheysson et al. ....... 359/15 |
| 5,206,499 | A | * | 4/1993 | Mantravadi et al. ..... 250/203.6 |
| 5,355,188 | A | * | 10/1994 | Biles et al. ............ 353/69 |
| 5,379,133 | A | | 1/1995 | Kirk ................. 359/15 |
| 5,430,474 | A | | 7/1995 | Hines ............... 348/42 |
| 5,703,717 | A | * | 12/1997 | Ezra et al. ........... 359/462 |
| 6,064,424 | A | | 5/2000 | van Berkel et al. ...... 348/51 |
| 6,429,913 | B1 | * | 8/2002 | Putilin ............... 349/62 |

FOREIGN PATENT DOCUMENTS

| | | |
|---|---|---|
| EP | 0653891 A1 | 5/1995 |
| GB | 1403783 | 8/1975 |
| WO | WO 01/04655 A2 | 1/2001 |

OTHER PUBLICATIONS

Valyus, Stereoscopy, Izdatel'Stvo Akademii Nauk SSSR, Moskva 1962. *Stereoscopy*, Chap. 3, Sec. 10, pp. 161-163 (1966) © 1966 Butterworth-Heinemann.
Schwartz, Head Tracking Stereoscopic Display. © 1986 IEEE. *IEEE Transactions on Electron Devices*, vol. ED-33(8), pp. 1123-1127 (Aug. 1986).

* cited by examiner

*Primary Examiner*—W. B. Perkey
*Assistant Examiner*—Magda Cruz
(74) *Attorney, Agent, or Firm*—Michael C. Staggs; Alan H. Thompson

(57) ABSTRACT

An autostereoscopic viewer is employed to produce aberration corrected images to simulate a virtual presence by employing pairs of projector optical components coupled with an image corrector plate and a field lens. Images are designed with magnifications and optical qualities and positioned at predetermined eyezones having controlled directional properties. The viewer's eyes are positioned in these eyezones. The size of these zones is related to the aperture of the projection lenses, the magnification produced by the Fresnel(s), and the optical properties and position of the image corrector plate.

22 Claims, 4 Drawing Sheets

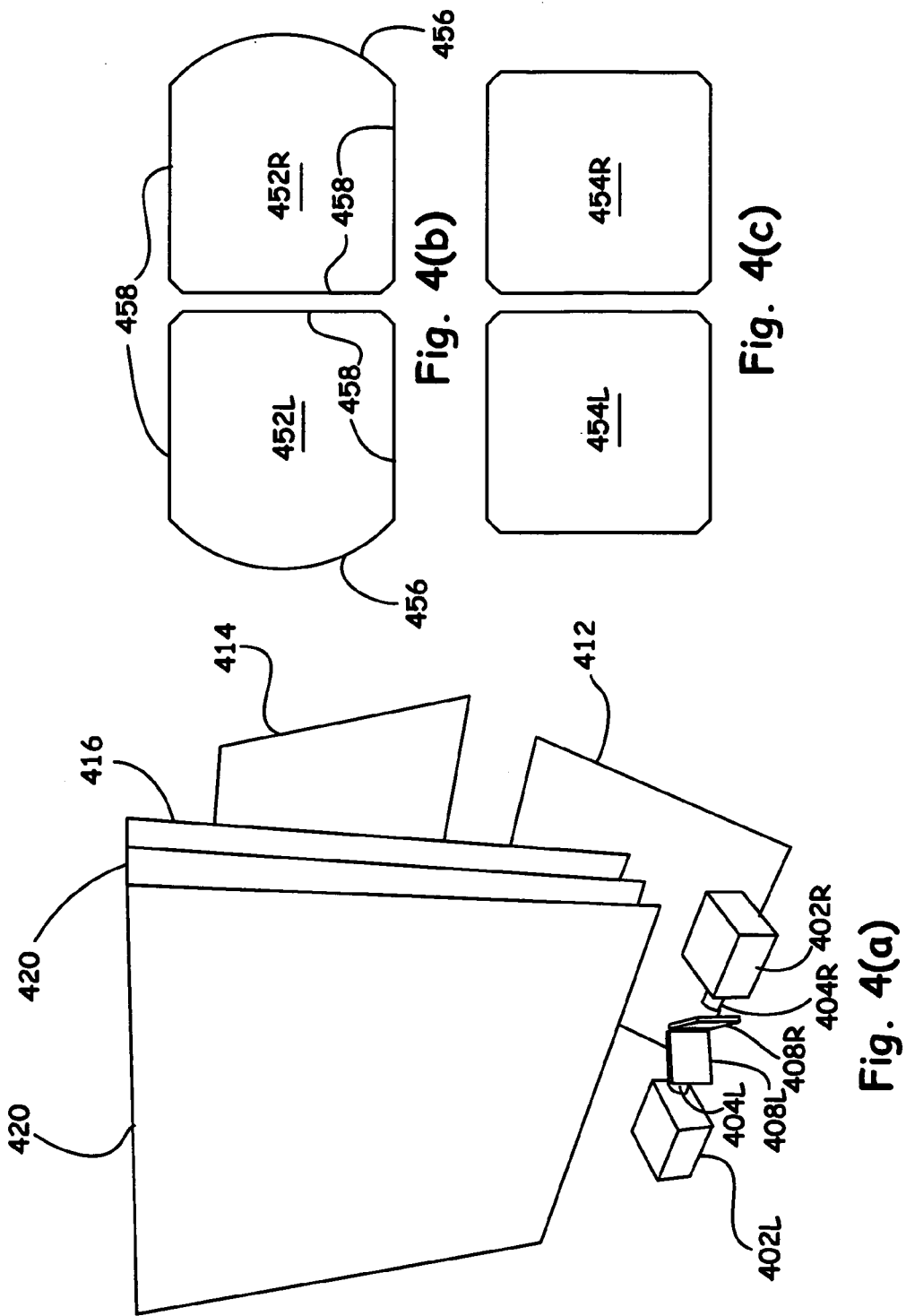

AUTOSTEREOSCOPIC PROJECTION VIEWER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a method and system for producing stereoscopic images (i.e., one view for each eye of an observer), and more particularly to an autostereoscopic system and method that produces aberration corrected images with an apparent size, distance, color and detail to simulate a virtual presence.

2. Description of Related Art

Recently, 3D systems have become of interest because technology has made 3D-like displays a part of daily life. For example, present technology can provide holographic images on credit cards and on driving licenses. We have home desktop computers that can generate interactive displays with stereoscopic image pairs. Three dimensional (3D) arcade games with advanced optical and computer helmet displays that are available that can produce virtual images.

Currently, images provided by conventional 3D viewing systems are too small or close to appear as full scale. In addition, such systems do not produce images with the optical characteristics of a real image and often require the need for viewing aids. Autostereoscopic viewers can provide three-dimensional (3D) images to a viewer without the need for glasses or other viewing aids. From a viewer's perspective, the wearing of special glasses is cumbersome and from a provider's perspective, expensive for such viewing aids. By employing holographic techniques in an autostereoscopic viewer, special glasses or other viewing aids are no longer a requirement because virtual 3D effects can be achieved without the need for such ancillary devices.

However, while a number of autostereoscopic imaging systems have been patented and or disclosed in printed publications, none of the related systems disclose a system tuned for the aberration-free properties with the multiple imaging capabilities that the present invention provides.

Accordingly, a need exists for an autostereoscopic aberration corrected method and system for producing full-scale virtually real images. Such a method and system is easy to use by operators and is capable of being implemented in a variety of commercial and non-commercial applications.

SUMMARY OF THE INVENTION

The present invention is directed to an autostereoscopic projection viewer employed to produce aberration corrected stereoscopic images by employing pairs of projection optical components coupled with an image corrector plate and a field lens.

Another aspect of the present invention is directed to an autostereoscopic projection viewer employed to produce aberration corrected stereoscopic images by employing up to three pairs of projection optical components coupled with an image corrector plate and a pair of Fresnel lenses operating collectively as a field lens.

Another aspect of the present invention is directed to an autostereoscopic projection viewer employed to produce aberration corrected stereoscopic images by employing pairs of projection optical components coupled with a Fresnel prismatic beam-splitter, an image corrector plate, and a field lens.

A final aspect of the present invention is directed to a method of optically relaying images from one or more pairs of projection displays to one or more pairs of optical eyezones and correcting optical aberrations produced by the optical relay, wherein one or more pairs of stereoscopic images, as seen by the unaided human eye, are produced.

Accordingly, the present system and method provides a desired system and method capable of stereoscopic vision in recognizing spatial structures and virtual objects for information and communication systems. It may also be implemented for displays in simulators, control stations, computer workstations, monitors for communication, medicine, multimedia and game machines. Optical folding techniques and software are combined with other aspects of the present invention to produce a compact package for workstation or arcade use.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 4(a) illustrates a folded geometry example of the present invention.

FIG. 4(b) shows a pair of projector lens arranged in a square geometry.

FIG. 4(c) illustrates another beneficial example of projector lenses of the present invention having a square geometry.

DETAILED DESCRIPTION OF THE INVENTION

Figure 1:
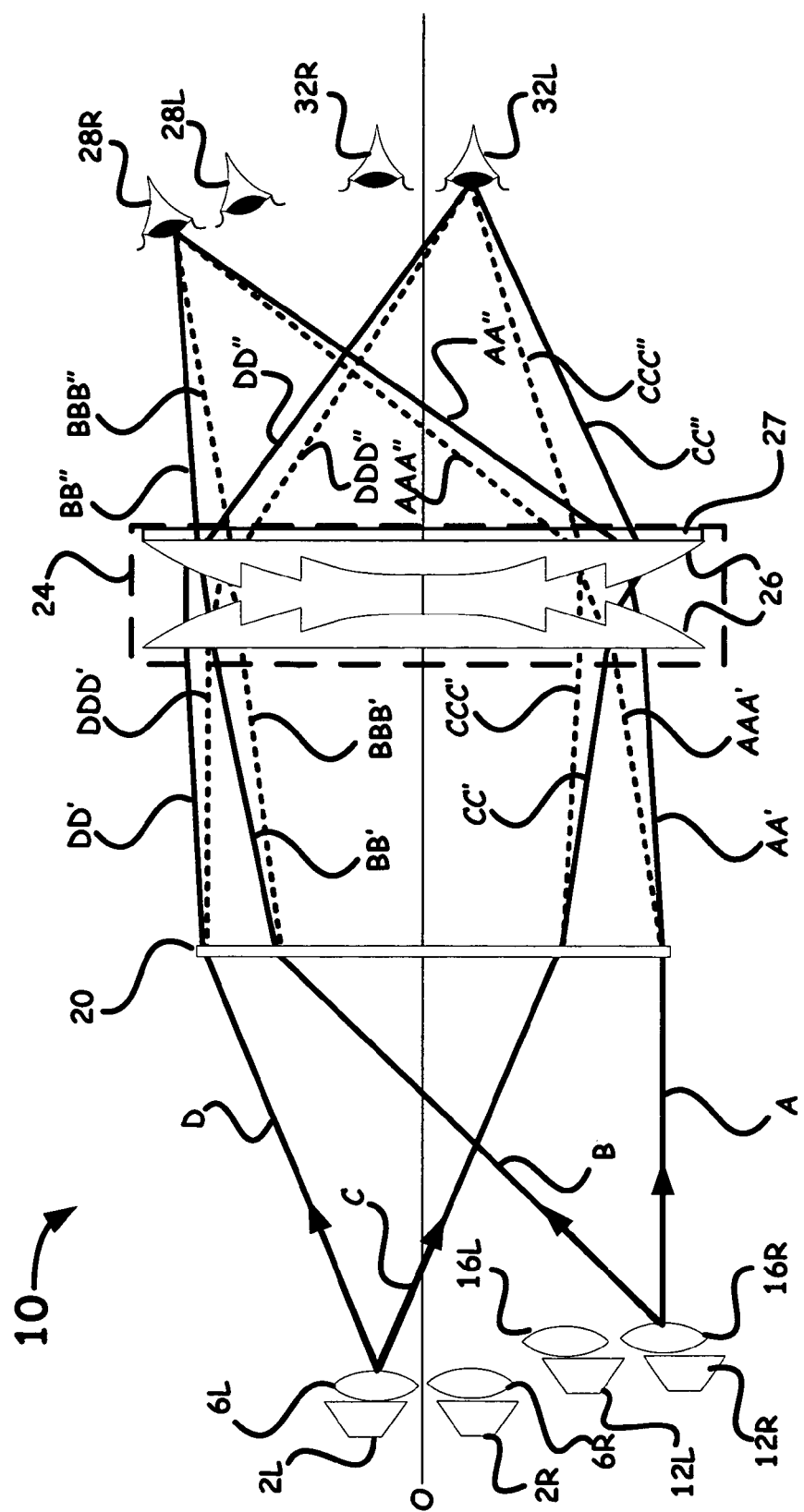
FIG. 1 shows a general schematic of an autostereoscopic projection viewer.

Referring now to the drawings, specific embodiments of the invention are shown. The detailed description of the specific embodiments, together with the general description of the invention, serve to explain the principles of the invention.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

General Description

The present invention allows direct viewing of three dimensional (3D), full color, aberration (e.g., chromatic, coma, spherical, astigmatism, distortion, and curvature of field aberrations) corrected images that are capable of being viewed by the unaided human eye, i.e., without the requirement of viewing helmets, polaroid glasses, or other viewing aids. The present invention also provides a system and method of projecting images from one or more pairs of projection displays, often 1 pair, more often 3 pairs, such as, CRT's, transparencies, projection sources (e.g., liquid crystal spatial light modulators (LC SLMs)), plasma sources, digital light projectors (DLPs), etc.), and/or flat panel monitors). Three dimension models may also be used to generate stereoscopic views on demand from databases. These images may also be generated from real photos, analog based or digital images or such images may be computer generated. Virtual touring is likely to be accomplished using gaming controls, such as, for example, joysticks, mouse operations, and/or keyboard controls. The tours can be produced for gaming, medical, promotional, or scientific applications.

Immersive wide-angle (i.e., up to about 60 degrees) viewing for a single viewer is possible with an optically corrected system disclosed herein. For example, a typical single viewer system might employ a 40" diagonal with the viewer situated 36" in front of a first Fresnel. In another arrangement, an on-axis viewer (having about a 30 degree field of view) can be positioned close to a field lens (i.e., less than about 60 inches) of the system and additional viewers (having less than about a 30 degree field of view) can view their stereoscopic images at positions behind the on-axis viewer by configuring their object and image planes, respectively.

The projection system of the present invention also typically employs one or more Fresnel lenses operating as a field lens, one or more pairs of projector lenses, often 1 pair, more often 3 pairs, and an image correcting plate. The role of the field lens is to capture light rays emanating outward from the projection lenses and bring such rays into the zones where the viewers place their eyes. The purpose of a corrector plate is to capture rays that would not arrive at the eyezones and redirect the light to the correct locations (i.e., to the eyezones). The present invention is capable of producing eyezones that a viewer naturally and comfortably can locate, and sustains the ideal viewing position such that all points of an image appear to be uniform in brightness and coloration. A set of ideal eyezones have narrow regions of image overlap between the left and right images of less than about 0.5 inches. It is desirable that both the left and right eyezones are substantially wide (i.e., greater than about 3 inches) to enable both eyes of a viewer to see either a left or a right monoscopic image. Vertically extended eyezones accommodate all viewers independently of their height or the vertical movements of their heads. The vertical extent of an eyezone is limited by available light and the design of the surfaces designed to distribute that light. The forward and back sensitivity of a viewer's head position depends on the effective field lens (e.g., a pair of Fresnel lenses) diagonal dimension, focal length, viewing distance, and the resulting "depth of focus" of the image of the projection lens as produced by an example pair of Fresnels and related optics. Color tinting of an image in this region is due to the Fresnel field lenses and is corrected using a custom zone plate designed to match an assembled system of the present invention.

The apertures of the projector lenses are projected as images onto the viewer's side of a Fresnel operating as a field lens. Thus, the size (e.g., the diameter of the projector lenses) is a factor in the size of the eyezones in addition to the magnification of the field lenses' optical image relay. Large lenses are one way to make large eyezones. Magnifying the image of small lenses is another way to produce large viewing zones. Square lenses may also be utilized to reduce dark areas between viewing eyezones because such square geometries allow joining or spacing between collective pairs of projector lenses of down to about a millimeter, by, for example, trimming such lenses. High quality projector lenses, i.e., field flattened color corrected multi-element lenses, are desirable in the present invention because they often produce the highest quality images. However, Fresnel lenses may also be used as projector lenses in the present invention depending on the specifications desired by a user.

Eyezone size is also a function of the controlled angular divergence of an imaging surface (i.e., the surface of the corrector/screen/zone plate). If such a surface receiving the projected images provides three degrees of angular divergence, the images of the projection lenses are spread vertically by that amount over the distance from the corrector/screen/zone to the eyezones. Since all points from the image are directed to all points in the eyezones, the viewing eyezones are vertically enlarged. Thus, vertical extensions of the eyezones are possible using controlled forward "scatter" produced by any suitably textured optical window in the image plane whether produced using holographic, chemical, or mechanical methods.

When low brightness projection display sources, such as, conventional CRTs are used, it is desirable to capture as much of the available light as possible using fast lenses (i.e., low f-numbers), such as below about 1.5, to prevent images from being optically defective (e.g., difficult for the unaided human eye to visually see). Such fast lenses having diameters of at least about 2 inches and positioned close (e.g., at least about a focal length) to a light limited projection display, such as, for example, a CRT, a flat panel, or other diffuse luminous image source optimizes the light gathering power of the system.

Molding and optical fabrication techniques allow one to directly master or replicate precision optical surfaces and components that are to be utilized in the present invention. Fresnel optical surfaces may be considered as arrangements of small prisms with angles and orientations, often oriented like saw teeth with the same or changing angles. Diffusers may be generally regarded as a random array of prisms, at random angles, pointed in different directions. Holographic elements have features on the scale of lightwaves and interact with the waves themselves via diffraction. This is different than using diffraction to produce patterns of light to make diffusers that are random prism arrays. The holographic optical elements used in the present invention utilize both refractive and diffractive methods to produce the specialized corrective projection surface.

The zonal plate, conjugate corrector, and eyebox projector combination that can make up the image corrector plate of the present invention are produced by holographic techniques, i.e., recordings of light intensity patterns created by the interference of two beams of mutually coherent light. In addition, Fresnel lens flaws can be minimized using a holographic optical element to additionally correct for aberrations, e.g., chromatic aberrations produced by such lenses.

The image correcting plate can be designed to be a combination of a zonal plate corrector to correct for chromatic dispersion of the Fresnel lenses, a conjugation corrector to invert phase perturbations produced by the Fresnel lenses, and an eyebox projector to reproduce a viewing window at a predetermined optical eyezone or any combination of the above. The image corrector plate is thus a special holographic optical element (HOE) that can intercept optical rays, often in a plane of the projection displays, and can redirect such rays in a controlled fashion using holographically imprinted information.

The image corrector plate is most often a volume hologram, wherein an interference pattern is recorded as a periodic variation in the refractive index of the material while the thickness of the material remains fixed. The periodic variation in the refractive index can create surfaces of peak refractive index within the material and is created by two or more waves of varying curvature at the hologram surface. However, the corrector plate can also be a blazed hologram wherein the imprinted information is solely on the surface of such an optical element.

Materials, such as, but not limited to, silver halide emulsions, hardened dichromated gelatin, ferroelectric crystals, photopolymers, photochromics and photodichroics, are capable of being employed to create such holograms. Dichromated gelatin is most often used to record such holograms in the present invention because such a material has a high-diffraction efficiency (e.g., greater than about 90%) and low noise characteristics (e.g., less than about 3%) that are desired by such applications disclosed in the present invention.

The zonal plate aspect of the image correction plate compensates for the undesired dispersive properties of Fresnel lenses made from such materials. Specifically, a zone plate can operate as a diffractive thin lens and can be produced by holographically recording spherical wavefronts from laser point sources. Use of a conventional zone plate does not correct for a system's aspheric aberrations produced by Fresnels as well as a zone plate designed specifically for such a purpose. The dispersive color effects are thus eliminated when such a zone plate is introduced into the system to produce chromatically uniform eyezones. In addition, a zone plate adapted on a predetermined surface of a Fresnel can likewise reduce the dispersion of a specific Fresnel used for producing images.

The eyebox projector aspect of the present invention can correct for off-axis astigmatically distorted images produced by fast field lenses using conjugate correction. A holographic aperture is imprinted in the image corrector plate from a predetermined optical plane within the projection viewer system to create an eyebox projector. Projected light passing through any portion of such a holographic eyebox projector is capable of being redirected at controlled angles to pass through an example field lens, such as, a Fresnel, so as to be received at a predetermined eyezone. Such an operation projects an image of a rectangle into a region where the Fresnels alone would only produce an imperfect focal spot because of, for example, astigmatism, and operates to correct for such an example aberration. While this beam correction can be made about the center wavelength, it can also operate to improve all other predetermined wavelengths. However, multiple wavelength exposure can additionally produce such an element to operate as a white light volume corrector.

A Fresnel's focus becomes distorted when an image source is greater than about 10 to about 15 degrees off axis. The use of a predetermined corrector can be designed to redirect the rays distorted by such a field lens (e.g., a Fresnel) so that all points on the image can arrive at the predetermined axis eyezones without such distortions. Specifically, Fresnels points some of the rays in undesired directions. A predetermined corrector redirects projected rays so that after they encounter the Fresnels, they are then capable of arriving at the desired eyezones, i.e., the correction is applied before such an aberration problem is encountered.

Holography is a recording of waves of light. The playback of such a recording allows the rays to be recreated and sent along their original direction or in the reverse path. This method allows one to focus a laser in front of a number of imperfect optics, pass the light though those optics, record the blur spot, playback the hologram in reverse through the imperfect optics, and project a substantially perfect image of the focused laser back upon its source. This method is known in the art as phase conjugate correction.

The conjugation corrector aspect of the image correction plate also requires the Fresnel(s) when holographically imprinting the information of the optical aberrations produced from such lenses. To create such an aspect of the optical element, a pattern of light is produced that is approximately the size of a designed eyebox and is located in an eyebox position in relation to the Fresnels. Specifically, light is designed to pass from a predetermined "eyezone" through the Fresnels and onto a predetermined plane where a holographic "plate" (e.g., the image corrector plate) is located to record the optical path of light through such Fresnels. Recording this requires the use of a "reference beam" that does not have the optical flaws introduced by the system. A lack of space between the Fresnel and the corrector plate requires the recording of the Fresnel wavefront substantially near its focus to allow room to inject the reference beam to produce the first hologram. This hologram is played back using a reversed reference beam to project an image of the Fresnel back upon itself such that a corrected image of a point of light in front of the Fresnel is capable of being produced. The reversed playback condition allows the production of the corrector plate by recording the playback with a reference beam. If the radius of curvature of the reference beam is properly considered, a zone plate is produced that can also correct for the dispersion of the Fresnels. When making this hologram, an array of points is used in the shape of a desired eyebox with separate recordings made for the on-axis and off-axis rays.

Since each point of light can produce a shadow of a Fresnel, it is desirable to have a sufficient number of points, e.g., by producing light from a diffuser, such that the shadows of the Fresnel are so numerous and distributed that they can cancel any faults in the finished optical element. Specifically, the reverse through this element when utilized in the present invention produces a redirection of the rays to correct the aberrations for a viewer.

Immersive wide-angle (i.e., approximately a 60 degree diagonal) viewing for a single viewer is possible with an optically corrected system disclosed herein. A multi-viewer system positions an on-axis viewer (having about a 30 degree field of view) further from the field lens (i.e., at least about 60 inches). Additional viewers (having less than about 30 degree field of views) view their stereoscopic images at positions behind the on-axis viewer by configuring their object (i.e., a respective projection display) and image planes, respectively.

The present invention may also employ diffusers, lenticular screens to enlarge optical exit pupils (i.e., eye zones), and/or prismatic Fresnel beam-splitters as an additional means to provide multiple large eye-zones for viewers.

Moreover, such a system of the present invention can be operationally computer-controlled to manipulate images and/or to make hardware adjustments of individual optical components to compensate for various users optical viewing differences and/or for optimizing the system. For example, the use of a digital pan and zoom allows the user great flexibility in viewing the images. Keyboard controls, such as arrow keys, may be used to control viewer position. Other keys may be used to adjust the relative position of the images in relation to each other for the purpose of "vergence" control, vertical offset, rotation, or distortion correction. In addition, the positioning of the pair of images and their window(s) may be computer software-controlled.

Specific Description

A viewing distance (i.e., an eye relief) of the present invention is at least about the diagonal of a field lens (e.g., a dimension of at least about 15 inches). A viewer sees at least greater than about a 1:1.2 magnified and apparently distant, stereoscopic image from a predetermined optical component, such as, for example, an image corrector plate, a prismatic Fresnel beamsplitter, an optical conjugator, a screen, such as, a lenticular array and/or an optical diffuser, or any optical element arranged to be in a designed optical plane before an example field lens (e.g., about ⅙ of a field lens focal length). Because the image plane appears behind the Fresnels it is magnified and appears more distant than it actually is.

The viewer only sees the pair of images when their eyes are properly positioned in a pair of predetermined eyezones. The predetermined eyebox or diffuser properties, the size of the projection lenses, and any magnification of a field lens determine the size of each of the one or more pairs of eyezones.

A single Fresnel lens can be employed for the "finite conjugate" of the present invention when utilized as the field lens (a field lens increases the field of view without increasing the dimensions of a predetermined lens, e.g., optical eyezone). More often, a pair of "infinite conjugate" Fresnels may be used to make a single fast Fresnel. A separation from about 3 to about 5 inches between the two lenses has the effect of reducing the alignment of the concentric structure in the lenses, thus minimizing moire effects (i.e., the spurious patterns resulting from the interference beats between two or more sets of periodic structures in an image) between the lenses and possible additional moire effects which can occur from the optical information produced by the pixels from projection displays (e.g., CRTs) disclosed in the present invention.

To obtain large diameter lenses of at least about ½ meter diagonal with fast f-numbers, Fresnel lenses of the present invention are conventionally made from a material, such as, acrylic, or styrene because such lenses are light, easily manufactured, and are cost effective. However, such lenses have chromatic dispersive properties that often require correcting when employed in an optical imaging system. Newly developed resin materials that have high UV light transmission of up to about 92% with low optical dispersion (i.e., abbe numbers of 56) may be a way of making Fresnel lenses so as to reduce the chromatic aberration problems that occur with materials such as acrylic or styrene.

The present invention can have eyezones of at least greater than about 1 inch along the long axis dimension but more often the present invention is designed to have eyezones of between about 4 inches wide and about 24 inches high for each eye to allow a user to comfortably and easily position oneself such that optically relayed stereoscopic images of a projection display can be seen. In addition, example eyezones that are four inches wide can provide a monoscopic image for both eyes of a viewer, a situation that is more desirable than darkness in one eye when the viewer is off-axis.

FIG. 1 illustrates an example embodiment of an autostereoscopic projection viewer, often designed for 3 viewers, and is generally designated by the reference numeral 10. Such an example embodiment shows an optical axis, denoted as O, a pair of left and right substantially on-axis projection displays 2L, 2R, (i.e., a center of such a display is at least about 0.5″ off-axis and a center to center of such pairs of displays is at least about 1″), a pair of substantially on-axis projection lenses 6L, 6R, at least one pair of left and right of up to about 60 degrees off-axis projection displays 12L, 12R, such as, for example, CRT's, transparencies, photographs, projection sources (e.g., liquid crystal spatial light modulators (LC SLMs)), transparencies, plasma sources, digital light projectors (DLPs), etc.), flat panel monitors, or any other projection display with sufficient intensity to produce an image by the present invention and at least one pair of left and right off-axis respective projection lenses 16L, 16R.

In addition, autostereoscopic projection viewer 10 can employ an image corrector plate 20 arranged at about the focal plane of a projected image, i.e., up to about 5 inches from the nearest field lens 24, (shown as a dashed rectangle), such as, for example, at least one Fresnel lens, more often a pair of Fresnel lenses 26, that can operate collectively as a field lens such that pairs of eye-zones, e.g., right and left off-axis eye-zones 28R, 28L and right and left substantially on-axis eye-zones 32R and 32L are capable of being produced at distances from the last surface of field lens 24 of at least about a diagonal measured value of the long axis of field lens 24 (i.e., at least about 15 inches). As another example arrangement, a zonal plate 27 can be configured to be separated from the field lens along the optical path or adapted to a predetermined surface of the field lens (e.g., a predetermined surface of a Fresnel lens) or a zonal plate can be adapted to a predetermined surface of or separately apart along the optical path from pair of Fresnel lenses 126 operating collectively as a field lens, so as to reduce dispersive effects of the system of FIG. 1.

FIG. 1 illustrates an example embodiment wherein illustrative optical rays, e.g., A, B, C and D, of viewer 10, are directed from left to right without being redirected from an highly reflective optical element, e.g., one or more turning mirrors. However, as another embodiment, one or more a pairs of mirrors, having reflectivities of at least 90%, are capable of being arranged within the optical relay of FIG. 1 such the optical rays from each display can make one or more angular turns of up to about 90 degrees, and/or as another example, projection displays, such as, DLPs, LC SLMs, plasma sources, etc., may be designed to face each other in conjunction with one or more a pairs of highly reflective mirrors such the optical rays from each display can make one or more angular turns of up to about 90 degrees to produce a compact version of the viewer shown in FIG. 1. In addition, as another arrangement, projection viewer 10, as shown in FIG. 1, is capable of being designed to provide for solely an on-axis user, (e.g., a user observing stereoscopic images located at eyezones 32R and 32L) to simplify the system and save on component costs (i.e., limit the number of projection displays and projector lenses and scale down the size of optics, such as, for example the size of the Fresnel lenses).

In the method of the invention, referring to FIG. 1, example off-axis projection display 12R, which is one half of the off-axis display pair 12L and 12R, is designed to emit photons such that an off-axis viewer (e.g., shown as eyezone 28R) can observe images produced by projection display 12R. Image corrector plate 20 is arranged at about the image plane of projector lens 16R so as to receive photons emitted by projection display 12R, shown as a pair of optical rays A and B, after being directed by off-axis projector lens 16R. Chromatic components inherent in an example projection display 12R, shown as spatially dispersed rays AA' (shown as a solid line) AAA' (shown as a dotted line) and BB' (shown as a solid line), BBB' (shown as a dotted line) respectively, are received by, for example, pair of Fresnel lens 26, and are further directed as shown by rays AA" (shown as a solid line), AAA" (shown as a dotted line) and BB" (shown as a solid line), BBB" (shown as a dotted line) to a respective eye-zone 28R. For example, AA', AA" and BB', BB" can be the blue wavelength components (i.e., higher frequency) that is included in rays A and B respectively and AAA', AAA" and BBB', BBB" the red wavelength components that is included in rays A and B respectively (i.e., lower wavelength)

Correspondingly, substantially on-axis projection display 2L, which is one half of substantially on-axis projection display pair 2L and 2R, and substantially on-axis projector lens 6L are arranged such that an on-axis viewer (shown as eyezones, e.g. 32L, 32R) can observe images produced by projection display 2L within eye-zone 32L. Here, image corrector plate 20 can receive photons emitted by projection display 2L, shown as a pair of optical rays C and D, after being directed by off-axis projector lens 6L. Chromatic components inherent in rays C and D, as similarly discussed for rays A and B, are redirected by plate 20, as shown as spatially dispersed rays CC' (shown as a solid line), CCC' (shown as a dotted line) and DD' (shown as a solid line), DDD' (shown as a dotted line) respectively. Such rays are then received by pair of Fresnel lens 26, and are further directed, as shown by rays CC"(shown as a solid line), CCC" (shown as a dotted line) and DD" (shown as a solid line), DDD" (shown as a dotted line), to a respective eye-zone 32L.

Multiple projection displays, as shown in FIG. 1, is an example embodiment of allowing multiple viewers to use the same field lens, e.g., pair of Fresnel lenses 26. Often, users, such as, video gamers want to interact, i.e., play, with others while sharing a divided screen. Thus, dividing viewing eyezones in the present invention, as shown in FIG. 1, provides a different but stereo view to all of the players. Such an embodiment is beneficial because individual players can be networked onto a single game and each has their own screen. It is also beneficial that the present invention is capable of adjusting optical components to produce optimized images for individual users. Such adjustments can include, but is not limited to, computer controlled digital pan and zoom of the images, keyboard controls, such as, arrow keys, may be used to control viewer position or to adjust the relative position of the images in relation to each other for the purpose of "vergence" control, vertical offset, rotation, or distortion correction.

Horizontal keystone correction is required for such multiple display off-axis projection systems. This is the condition where the off-axis projection displays are decentered from a respective projector lens but each projector lens and the image planes produced by such projector lenses are parallel and square to each other. A projection display on-axis (i.e., aligned on the optical axis) does not have this issue but off-axis and even substantially on-axis systems projects trapezoidal images. To correct the image, the eye-zones are tilted by up to about 60 degrees, as shown by 28R and 28L in FIG. 1, in relation to respective projector lenses to correct for the off-axis trapezoidal aberration.

Keystone correction is conventionally used to correct for vertical off-axis conditions but is also applicable to the off-axis horizontal embodiment of the present invention. This is especially true for a pair of off-axis eyezones but since all of the eyezones are off-axis even in the substantially on-axis viewing position, e.g., as shown by 32R and 32L in FIG. 1, this kind of correction ensures that all are in proper stereoscopic registration (i.e., rectangle on rectangle—not trapazoid on mirrored trapezoid).

Figure 2:
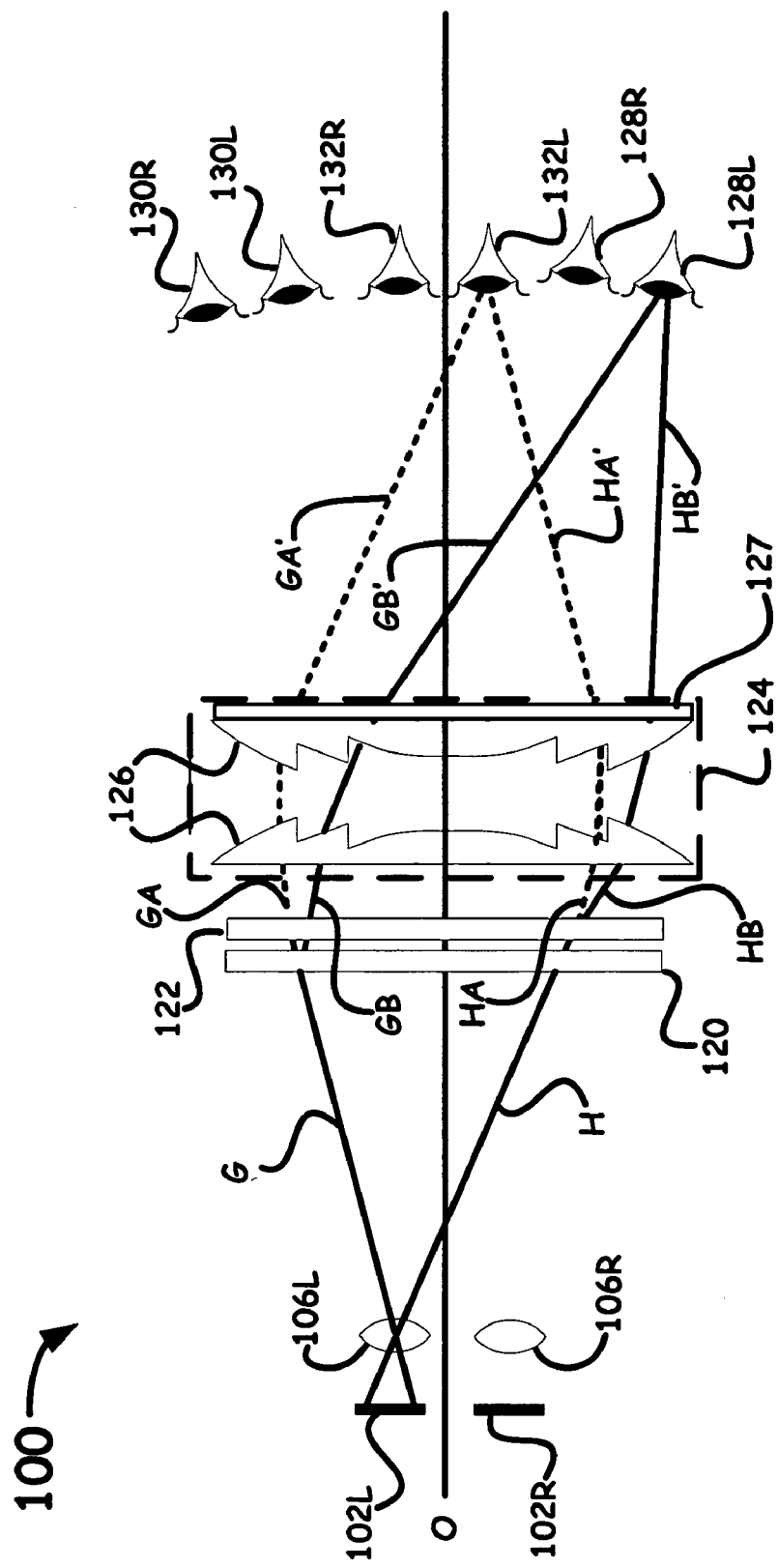
FIG. 2 shows a second embodiment of an autostereoscopic projection viewer.

An alternate example autostereoscopic projection viewer, often designed for up to about 3 viewers, is shown in FIG. 2 and is generally designated by the reference numeral 100. In this arrangement a Fresnel prismatic beamsplitter can by added in addition to the image corrector plate, as described and shown in FIG. 1, to enable at least a pair of substantially on-axis projection displays to be the sole source of allowing one or more viewers to observe stereoscopic images produced by such displays. Such a Fresnel prismatic beamsplitter is used to send a stereoscopic image towards one or more observer's eyes. Such an optical element has portions that are a multi-faceted window to the through rays to present an image to a viewer stationed on axis. The surface of the element also has an array of parallel prisms to direct light to eyezones on either or both sides of the on axis viewer.

The example embodiment of FIG. 2 shows an optical axis, denoted as O, a pair of left and right substantially on-axis projection displays 102L, 102R, a pair of left and right substantially on-axis projector lenses 106L, 106R, a Fresnel prismatic beam-splitter 120 arranged at about the projected image plane of projector lenses 106L, 106R (i.e., a magnified image from projector lenses 106L, 106R), an image corrector plate 122 capable of operating as an optical diffuser, and a field lens 124 (shown as a dashed rectangle), such as, for example, at least one Fresnel lens, more often a pair of Fresnel lenses 126, that can operate collectively as a field lens such that one or more pairs of eyezones, e.g., right and left off-axis eyezones 128R, 128L, 130R and 130L, and right and left substantially on-axis eye-zones 132R and 132L are capable of being produced at distances of at least about 8 inches (i.e., typically the diagonal of a field lens) from the last surface of field lens 124. However, as another embodiment, image corrector plate 122 can be removed from projection viewer 100 and longer field lens focal lengths can be utilized to constrain the angular views to between about 10 and about 15 degrees such that off-axis aberrations produced by Fresnel prismatic beam-splitter 120 are minimized. In addition, as another example arrangement, a zonal plate 127 can be separated from the field lens along the optical path or adapted to a predetermined surface of the field lens (e.g., a Fresnel lens) or a zonal plate 127 can be adapted to a predetermined surface of a pair of Fresnel lenses 126 operating collectively as a field lens or separately apart from such lenses along the optical path so as to reduce dispersive effects of the system of FIG. 2.

Lenticular screens (i.e., a flat arrangement of many cylindrical lenses (lenticules) which direct the light of all the pixels selectively into dedicated viewing areas) can also be added to such an arrangement to increase the size of eyezones (typically in the vertical dimensions) and to add comfort to a viewer positioned at eyezone locations. In addition, the image corrector plate can be designed to operate as a holographic optical diffuser or a predetermined optical diffuser can replace the image corrector plate when made from materials, such as, matte finished etched glass, texturized plastic films, and embossed films. Each diffuser can be selected, designed, or modified to provide the controlled forward scatter optimize for the lenses and brightness available.

Turning again to the figures, FIG. 2 illustrates an example multi-viewing arrangement wherein projection display pair 102L, 102R, are configured in viewer 100 such that on-axis (e.g., eyezones 132R, 132L) and off-axis observers (e.g., eyezones 128R, 128L) are capable of viewing stereoscopic images produced by such displays. In such an embodiment, Fresnel prismatic beamsplitter 120 and image corrector plate 122 are collectively arranged to receive directed photons by projector lens pair 106R, 106L, shown as optical rays G and H, and to direct such rays to pairs of eyezones without predetermined optical aberrations, such as, but not limited to, chromatic, coma, spherical, astigmatism, distortion, and curvature of field. For simplicity, the correction for the chromatic components produced by viewer 100, as shown in FIG. 2, is similar to the discussion for the embodiment, as shown in FIG. 1, when utilizing image corrector plate 122. Therefore, chromatic ray analysis is omitted in the discussion for the embodiment of in FIG. 2 to illustrate the multi-viewing positions produced by prismatic beamsplitter 120 in autosteroscopic projection viewer 100.

In the method of the arrangement shown in FIG. 2, Fresnel prismatic beamsplitter 120, positioned in a common image plane of projector lenses 106R and 106L, can receive example optical rays G, and H and can deviate such rays primarily dependent on predetermined angles of incidence and the location such rays make with respect to the multifaceted output surface (not shown) of Fresnel beamsplitter 120. As examples, ray G can be transmitted as a deviated or an undeviated ray after being received by Fresnel beamsplitter 120 and after correction as discussed above by image corrector plate 122, as shown by undeviated ray GA (shown as a dashed line) or deviated ray GB (shown as a solid line). Ray H can additionally be transmitted as a deviated or an undeviated ray after being received by Fresnel beamsplitter 120 and after correction as discussed above by image corrector plate 122, as shown by undeviated ray HA (shown as a dashed line) or deviated ray HB (shown as a solid line). Such rays then proceed through viewer 100 as shown by rays GA', GB', HA', HB' after being received by field lens 124 and are redirected to designed eyezones (e.g., 128R, 128L, and 128R, 128L), to provide for stereoscopic images.

The embodiment, as shown in FIG. 2, similar to the embodiment, as shown in FIG. 1, can also include one or more a pairs of highly reflective mirrors arranged such that the optical rays from each display can make one or more angular turns of up to about 90 degrees, and/or as another example, projection displays, such as, DLPs, LC SLMs, plasma sources, etc., may also be arranged to face each other in conjunction with one or more a pairs of highly reflective mirrors such that the optical rays from each display can make one or more angular turns of up to about 90 degrees to produce a compact version of the viewer, as shown in FIG. 2.

Figure 3:
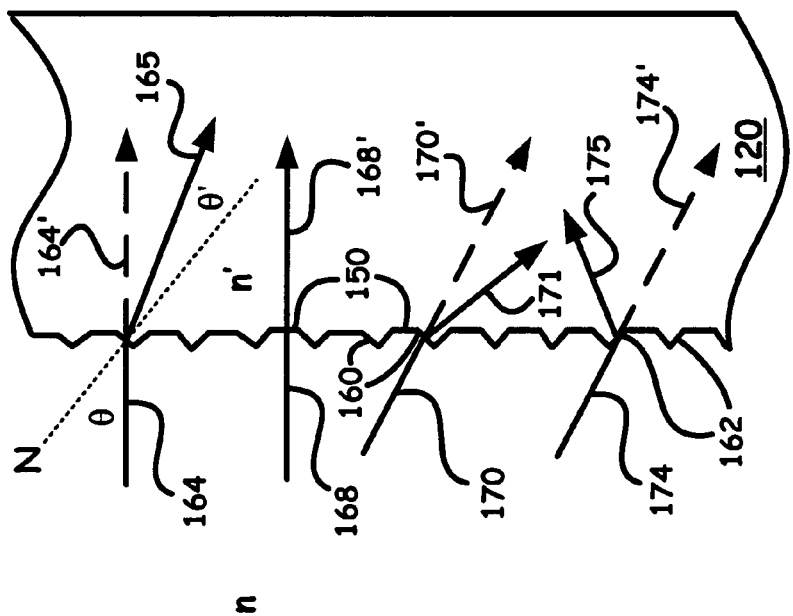
FIG. 3 illustrates a cross-sectional view of a multifaceted Fresnel beamsplitter.

FIG. 3 illustrates in cross-section, such a multifaceted Fresnel beamsplitter 120, as discussed above, having substantially flat surfaces 150, and designed prismatic surfaces 160, 162, and having a predetermined index of material so as to be capable of directing optical light rays to eyezones on either or both sides of an on-axis observer (not shown). As examples, an optical ray 164, (e.g., a ray collinear with optical axis O as shown in FIG. 2) having an incidence angle $\theta$ (defined by an angle ray 164 makes with a normal N, as denoted by a dotted line, to prismatic surface 160) is deviated (ray 164 if is shown as ray 164') by an angle $\theta'$, as shown by ray 165 according to Snell's law (n sin $\theta$=n' sin $\theta'$, where n is the index of the first medium, and n' is the index as seen by a transmitted ray). However, an optical ray 168, (e.g., an optical ray also collinear with optical axis O, as shown in FIG. 2) that is received normal to substantially flat surface 150 is capable of being transmitted as an undeviated ray 168' wherein such a ray is capable of being directed by the projection viewer, as shown in FIG. 2, to an on-axis observer. To further illustrate the directional properties of Fresnel beamsplitter 120, example optical rays 170 and 174 (undeviated rays are shown as rays 170' and 174') that are, for example, non-collinear with ray 168 but parallel to each other, can be deviated, as shown by rays 171 and 175, by prismatic surfaces 160, 162 respectively, and are capable of being directed, for example, to eyezones on either or both sides of an on-axis observer.

FIG. 4(a) illustrates a folded geometry example of the present invention so as to enable compact arrangements of the optical elements as shown in FIG. 1 and FIG. 2. As shown in FIG. 4, a pair of turning mirrors 408L and 408R, can be adapted to respectively receive images from a left projector 402L and a left projector lens 404L and a right projector 402R and a right projector lens 404R. Mirrors 408L and 408R accordingly direct the received illumination upward by a second arranged mirror 412, and then horizontally by a third mirror 414. Such illumination can then be received in the folded geometry of FIG. 4(a) by, for example, an image corrector plate 416 and a pair of fresnels 420, as discussed above and as shown in FIG. 1 and FIG. 2.

FIGS. 4(b)–4(c) illustrate example projector lenses of the present invention having a square geometry. The method of providing a stereo image to a viewer requires that images differing in perspective are provided to each eye. Providing images of equal intensity to the right and left eye is required for best effect. It is desirable that the relative intensity of the two images remains the same independently of the position of the viewer's eyes within the eyezones. Circles of light can be projected images of circular projection lenses as reimaged by a predetermined Fresnel of the present invention. However, if square lenses are used for projection, the images of these lenses will be projected by the Fresnels as square images so as to produce square eyezones.

FIG. 4(b) shows a left 452L projector lens and a right 452R projector lens arranged as a pair of lenses having one or more predetermined sides (i.e., sides labeled 458) arranged in a square geometry and a predetermined side of each such lenses arranged with a circular geometry 456. Such a configuration of the left 452L and right 452R projector lens produces an optical relayed image having the geometry as shown in FIG. 4(b) to predetermined eyezones of the present invention, as shown in FIG. 1 and FIG. 2.

FIG. 4(c) illustrates another beneficial example of projector lenses of the present invention having a square geometry. Specifically, FIG. 4(c) shows a left 454L projector lens and a right 454R projector lens arranged as square lenses. The square type of geometric shapes of such projector lenses are thus capable of being optical relayed to predetermined eyezones so as to produce square eyezones.

The shape of the eyezones are thus the shape of the projection lenses utilized and expanded by the diffusing properties of a predetermined screen surface of the present invention, such as image corrector plate 20 as shown in FIG. 1. A diffuser's scatter of the present invention is largely vertical, providing zones large enough to allow vertical head movement and low horizontal scatter preventing light from the right and left fields from crossing into each other. Circular lenses used with vertical diffusers provide eyezones that are brighter in their center than on their edges causing brightness to vary when the viewer moves from side to side. If the spacing between the eyezones is not equal to the user's eye spacing, the changes in relative brightness of the images can be detrimental to perceived quality.

The dark spaces between projection lenses is increased when the lenses are round and diminished when the edges of the lenses are ground flat to allow only a narrow space to exist between the lenses. These changes also result in eyezones having a diminished space between projected images of the lenses. If the top and bottom of the lenses are also ground off squarely the brightness of the eyezone is more uniform when a user's head moves slightly side by side. The outer edges of the lenses may also be ground off square, such as edge 456 as shown in FIG. 4(*b*), to produce the lenses as shown in FIG. 4(*c*), so as to enable for more than two projection lenses and to preserve the relative brightness for each eye.

It should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An autostereoscopic projection viewer, comprising:
   one or more pairs of projector lenses configured to correspond to one or more pairs of respective projection displays,
   an image corrector plate arranged about an image plane of each said pair of projector lenses, wherein said image corrector plate is adapted to optimize two or more optical parameters selected from: chromatic dispersion, predetermined phase perturbation, and eyebox projector optimization; and
   a field lens, wherein said field lens is arranged at a predetermined distance from said projector lenses and said image corrector plate to produce one or more predetermined magnified stereoscopic aberration corrected and optimized images of said projection displays at predetermined one or more pairs of optical eyezones.

2. The viewer of claim 1, wherein said image corrector plate includes a volume hologram.

3. The viewer of claim 1, wherein said field lens includes a pair of Fresnel lenses adapted to operate collectively as a field lens and having a respective lens separation from about 3 to about 5 inches to reduce moiré effects.

4. The viewer of claim 3, wherein said field lenses include a zonal plate.

5. The viewer of claim 1, wherein said optical aberrations includes at least one from: coma, spherical, astigmatism, distortion, curvature of field and chromatic.

6. The viewer of claim 1, wherein said viewer includes a folded geometry.

7. The viewer of claim 1, wherein said projector lenses have a square geometry.

8. The viewer of claim 1, wherein said projection displays include at least one from: CRT's, transparencies, liquid crystal spatial light modulators, transparencies, plasma sources, digital light projectors, flat panel monitors, photographs.

9. The viewer of claim 1, wherein said transmission displays include one or more computer generated images.

10. The viewer of claim 1, wherein said images include keystone correction.

11. An autostereoscopic projection viewer, comprising:
    up to about three pairs of projector lenses configured to correspond respectively to at least three pairs of projection displays,
    an image corrector plate arranged at an optical image plane for each said pair of projection lenses, wherein said image corrector plate is capable of correcting for predetermined optical aberrations; and
    a pair of Fresnel lenses adapted to operate collectively as a field lens, wherein said pair of Fresnel lenses are arranged at predetermined distances from said projection lenses and said image corrector plate to produce one or more predetermined stereoscopic aberration corrected images of said projection displays at predetermined one or more pairs of optical eyezones.

12. An autostereoscopic projection viewer, comprising:
    a pair of projector lenses, configured to correspond to a respective pair of projection displays and direct optical rays from said projection displays,
    a prismatic Fresnel beamsplitter, arranged substantially about an image plane of each said pair of projector lenses and adapted to produce a plurality of predetermined optical eyezones,
    an image corrector plate arranged to receive and redirect said optical rays received from said Fresnel beamsplitter, wherein one or more aberrations produced by said viewer are corrected; and
    a field lens arranged at predetermined distances from said projection lenses and said Fresnel beamsplitter to produce one or more predetermined magnified stereoscopic aberration corrected images of said projection displays at said eyezones.

13. The viewer of claim 12, wherein said viewer includes an optical diffuser.

14. The viewer of claim 12, wherein said image corrector plate is capable of being constructed as a holographic optical diffuser.

15. The viewer of claim 14, wherein said image corrector plate includes a volume hologram.

16. The viewer of claim 12, wherein said viewer includes a folded geometry.

17. The viewer of claim 12, wherein said field lens includes a zonal plate.

18. The viewer of claim 12, wherein said projector lenses have a square geometry.

19. The viewer of claim 12, wherein said viewer includes a lenticular array, said array having a plurality of lenticules extending laterally such that optical rays directed from said projection displays are displaced vertically.

20. The viewer of claim 12, wherein said projection displays include at least one from: CRT's, transparencies, liquid crystal spatial light modulators, transparencies, plasma sources, digital light projectors, flat panel monitors, photographs.

21. The viewer of claim 12, wherein said transmission displays include one or more computer generated images.

22. The viewer of claim 12, wherein said field lens includes a pair of Fresnel lenses adapted to operate collectively as a field lens and having a respective lens separation from about 3 to about 5 inches to reduce moiré effects.

* * * * *